April 27, 1965   C. O'CONNOR   3,180,603
INSTRUMENT SUPPORTING HEAD
Filed June 1, 1961   4 Sheets-Sheet 3

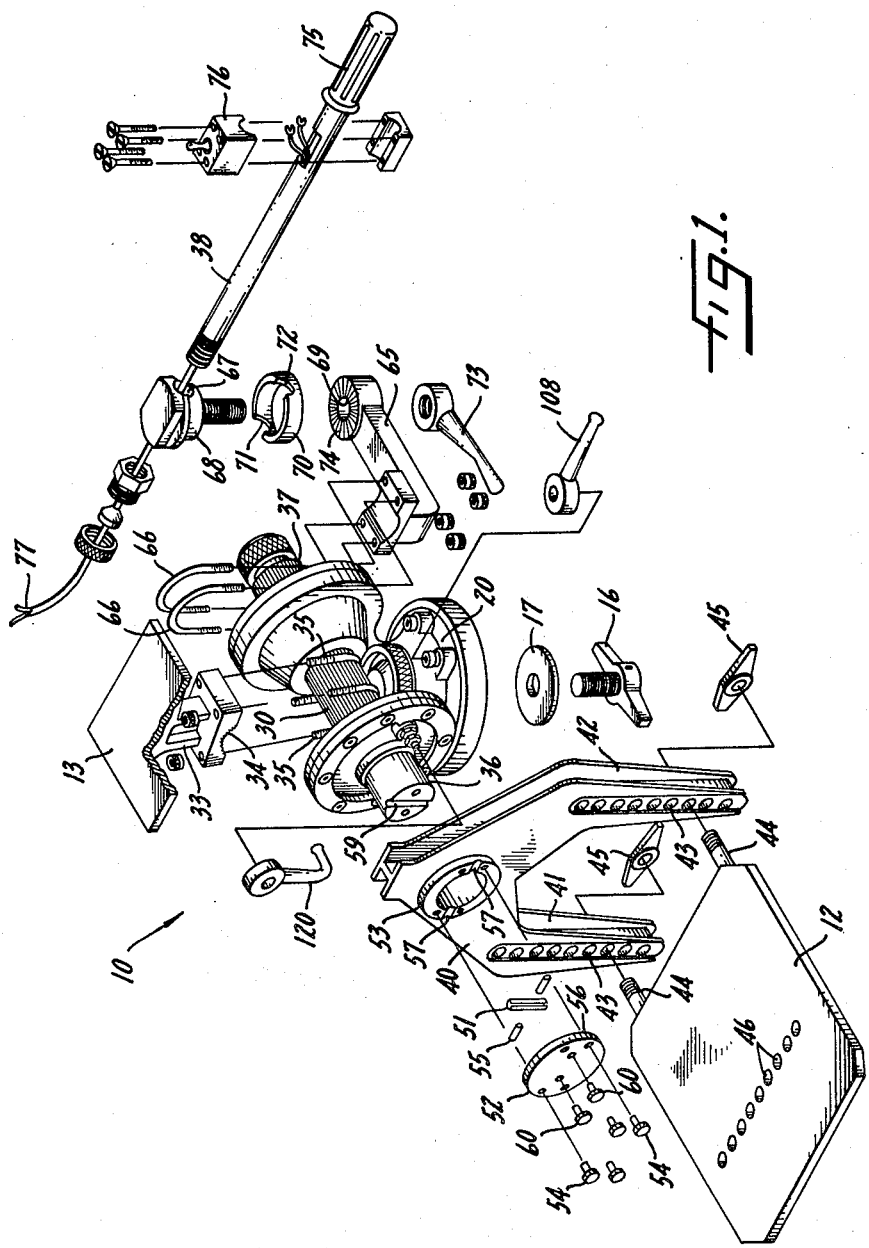

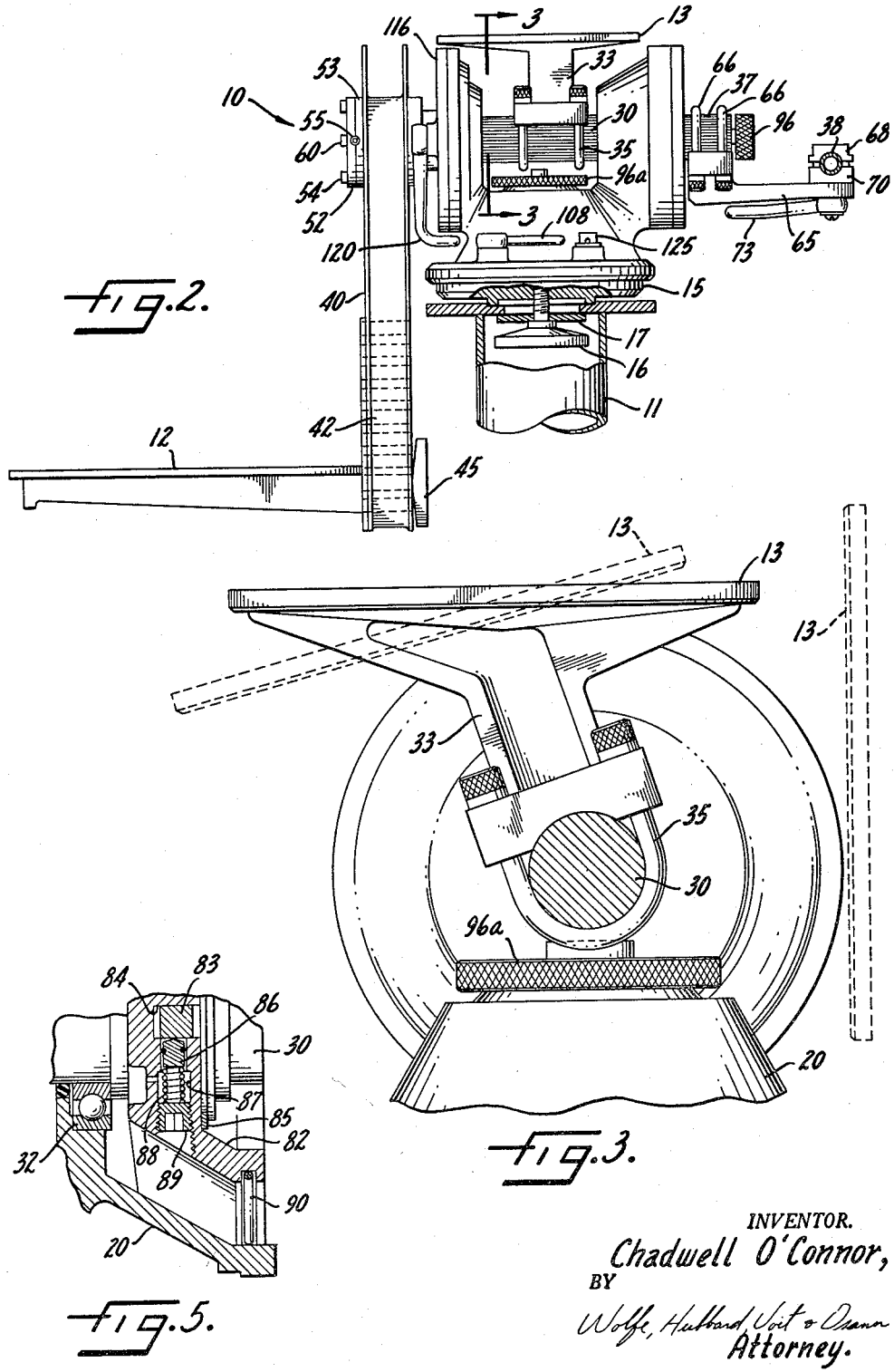

INVENTOR.
Chadwell O'Connor,
BY
Wolf, Hubbard, Voit & Osann
Attorney.

April 27, 1965 C. O'CONNOR 3,180,603
INSTRUMENT SUPPORTING HEAD
Filed June 1, 1961 4 Sheets-Sheet 4

INVENTOR.
Chadwell O'Connor,
BY
Wolf, Hubbard, Voit & Osann
Attorney.

United States Patent Office 3,180,603
Patented Apr. 27, 1965

3,180,603
INSTRUMENT SUPPORTING HEAD
Chadwell O'Connor, 9862 Highland Ave.,
Alta Loma, Calif.
Filed June 1, 1961, Ser. No. 114,085
12 Claims. (Cl. 248—183)

The present invention relates generally to optical instrument supporting devices and more particularly concerns a camera panhead.

It is an important object of the invention to provide a camera panhead having a novel drag mechanism that produces a very uniform and smooth resistance to tilting and panning movements and which can be easily and precisely adjusted to the exact degree of resistance desired. A collateral object is to provide a drag mechanism of the above type that is completely reliable in operation and economical to manufacture.

Another object of the invention is to provide a panhead of the above character that can support and control the movement of very heavy cameras and which is particularly well suited for tilting heavy cameras to the extreme vertical angles required in missile tracking work.

A further object is to provide a panhead of the above type having no "play" or looseness in the camera platform or its mounting and which can be quickly and conveniently locked with the camera at any desired angle without shifting the position of the camera as much as one thousandth of an inch.

It is also an object to provide a panhead as described above which is easily and completely adjustable as to handle position, camera-platform disposition and auxiliary instrument platform angle.

It is another object to provide a panhead as characterized above having all critical operating parts enclosed and sealed so as to be well suited for reliable operation under extremely adverse conditions.

Other objects and advantages of the invention will become apparent upon reading the following detailed description and upon reference to the drawings, in which:

FIGURE 1 is an exploded perspective view of a camera panhead constructed in accordance with the present invention;

FIG. 2 is a slightly enlarged elevation of the panhead, assembled, shown in FIG. 1;

FIG. 3 is an enlarged fragmentary section taken approximately along the line 3—3 in FIG. 2;

FIG. 5 is a fragmentary section showing a detail of the panhead shown in FIG. 2;

Figure 4:
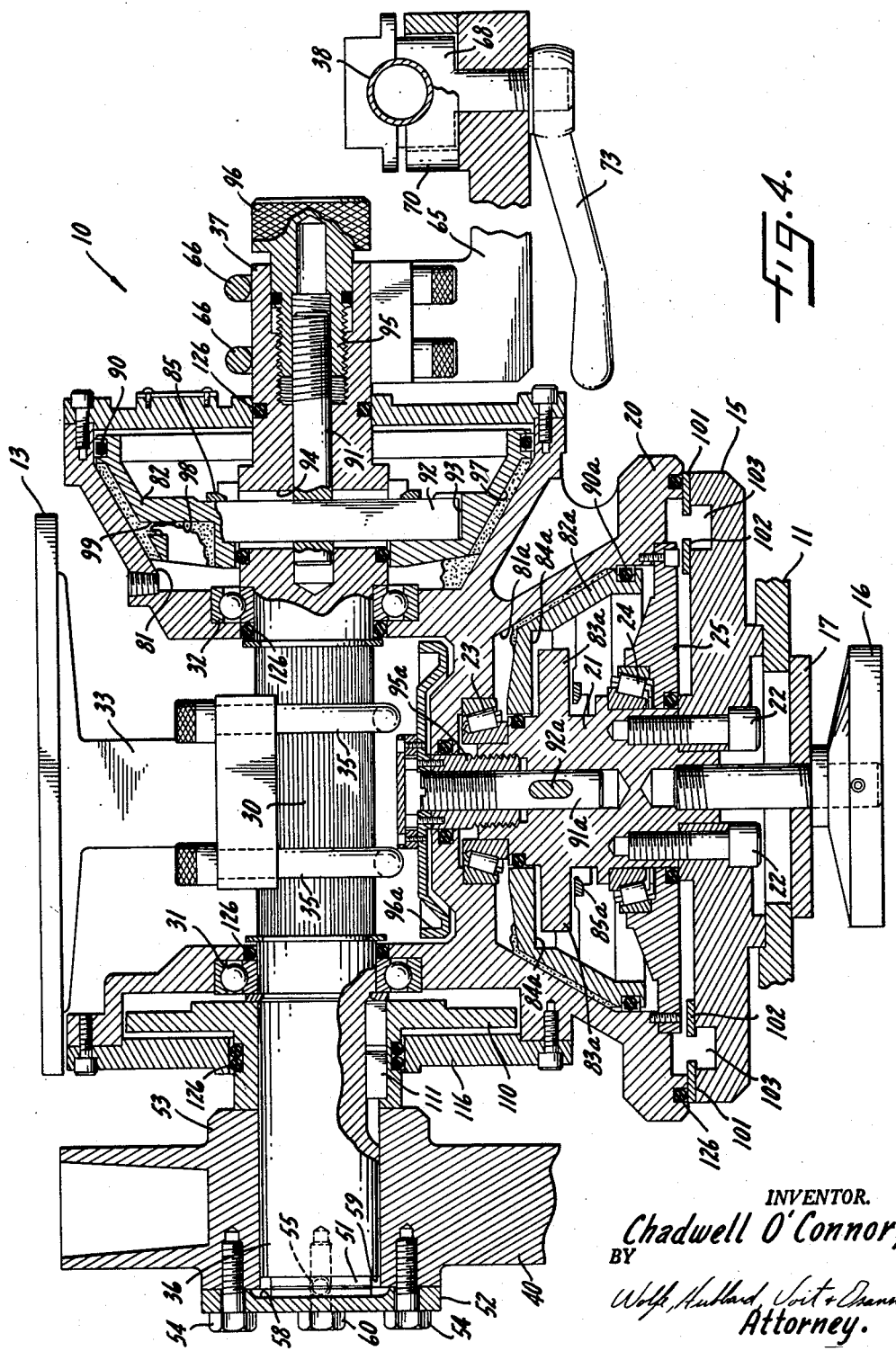
FIG. 4 is an enlarged transverse section of the panhead shown in FIG. 2.

While the invention will be described in connection with a preferred embodiment, it will be understood that I do not intend to limit the invention to that embodiment. On the contrary, I intend to cover all alternatives, modifications, and equivalents as may be included within the spirit and scope of the invention as defined by the appended claims.

Turning now to the drawings, there is shown a panhead 10 constructed in accordance with the invention. The panhead 10, chosen to illustrate the invention, is of the type primarily intended as a missile tracking tilt head and, hence, is particularly adapted to support heavy tracking cameras at extreme angles of elevation. The panhead is shown mounted, in FIG. 2, on a pedestal 11 which affords unobstructed freedom of movement for the head. For mounting a heavy tracking camera, a platform 12 is carried at one side of the head 10 and an auxiliary or instrument platform 13 is positioned above the head. The platform 13 is particularly convenient for use in mounting an optical or infrared finder often required for sighting a tracking camera.

The panhead 10 permits smooth panning as well as tilting movement of the equipment which it carries and thus its basic construction is obviously well suited for other, more conventional, panhead applications as well as missile tracking.

The panhead includes a base plate 15 which is seated on top of the pedestal 11 and secured thereto by a tie-down screw 16 which cooperates with a washer 17. Obviously alternative pedestal or tripod mounting arrangements can be employed by utilizing an appropriately shaped base plate.

Pursuant to the invention, the frame of the panhead 10 is defined by a housing 20 that encloses virtually all of the operable parts of the head and is rotatably mounted on a stub shaft 21 that is fixed to the base plate 15 by a plurality of cap screws 22. The housing 20 is rotationally locked on the stub shaft 21 by sets of tapered roller bearings 23 and 24, the latter being anchored in position by a bearing plate 25 rigidly fixed to the housing. The oppositely tapered roller bearing sets 23 and 24 prohibit relative axial movement between the housing 20 and the stub shaft 21 and completely eliminate looseness or play between the housing and the stub shaft so that a heavy camera supported on the platform 12 cannot skew or bind the panhead.

To provide a tilting axis, the camera platform 12 and instrument platform 13 are secured to a main shaft 30 which is journalled in the housing 20 on a generally horizontal axis by sets of ball bearings 31 and 32. The instrument platform 13 includes a pedestal 33 having an arcuate serrated portion 34 that is locked against a serrated center portion of the main shaft 30 by a pair of U-bolts 35. By loosening the nuts on the bolts 35, the angular position of platform 13 can be varied about the main shaft 30.

The main shaft 30 has opposite end portions 36 and 37 extending from the housing 20 on which are mounted, respectively, the instrument platform 12 and a handle 38. The platform 12 is secured to the extending shaft portion 36 by a bracket yoke 40 having depending arms 41 and 42 formed with a plurality of alined holes 43. The platform 12 carries spaced studs 44 which are adjustably positioned in selected ones of the holes 43. Wing nuts 45 are tightened on the studs 44 so as to rigidly lock the platform 12 on the yoke 40. For mounting a camera or other device on the platform 12, a plurality of alined openings 46 are formed in the platform on a line transverse to the axis of the main shaft 30. The openings 46 are adapted to receive a tie-down bolt for anchoring the camera to the platform.

By selecting a suitable set of holes 43 for mounting the platform 12 on the yoke 40, and by securing the camera by a tie-down bolt passed through a suitable one of the holes 46, the center of gravity of the camera can be made to substantially coincide with the axis of rotation of the main shaft 30. The spaciousness of the platform 12 and the length of the arms 41, 42 on the yoke 40 permit this adjustment to be made for even those cameras which are quite bulky and which are fitted with extremely long telephoto lenses. By bringing the center of gravity of a heavy tracking camera substantially into alinement with the axis of the main shaft 30, the panhead and camera can be tilted to the extreme vertical angles required in missile tracking work without unbalancing the assembly. The camera weight thus does not upset or interfere with smooth tilting movements even when very heavy cameras are mounted on the panhead 10. The camera and panhead remain in balance even when a substantially vertical camera angle or 90° tilt is approached. This arrangement also makes counterbalancing springs unnecessary and thus eliminates the difficult problems of adapting such springs for reliable operation through extreme tilting angles.

As a feature of the invention, the yoke 40 is secured to the main shaft 30 without "play" or looseness by tightly pressing a roll pin 51 between opposed grooves in the shaft and in a pin plate 52 that is secured rigidly to the yoke bracket. In the illustrated construction, the yoke bracket 40 includes a collar portion 53 which fits over the end portion 36 of the main shaft 30. The pin plate 52 is secured rigidly to the collar 53 by a plurality of cap screws 54, and preferably the rigidity in this connection is increased by interposing a pair of short roll pins 55 between opposed grooves 56 in the pin plate 52 and grooves 57 at the opposite sides of the collar 53. The pin plate 52 also includes a groove 58 which opposes a groove 59 formed in the end of the main shaft 30.

To mount the yoke bracket 40 on the main shaft, the roll pin 51 is sandwiched between the opposed grooves 58, 59 and a pair of cap screws 60 are passed through the pin plate into threaded engagement with the end portion 36 of the main shaft. The pin plate 52 is drawn snugly against the end of the main shaft, thus tightly compressing the roll pin 51 and, as a result, the connection is quite rigid and without any looseness or play between the camera platform 12 and the main shaft.

In keeping with the invention, the handle 38 is mounted on the end portion 37 of the main shaft 30 so as to permit a complete range of adjustments for the convenience of the operator. For this purpose, a bracket 65 is locked to the serrated outer portion of the end portion 37 of the main shaft by a pair of C-bolts 66. The handle 38 is in the form of an elongated tubular member which is passed freely through an aperture 67 formed in the head of the clamp bolt 68. The bolt is seated through an aperture 69 formed in the bracket 65 along an axis transverse of the axis of the main shaft 30. A ring 70 is interposed between the clamp bolt 68 and the bracket 65 and is formed with arcuate notches 71, 72 which receive the handle 38 when slidably fitted through the aperture 67. A locking nut 73 is threaded onto the bolt 68 so as to bear against the underside of the bracket 65.

When loosely assembled, that is when the locking nut 73 is backed off slightly from the bracket 65, the extension of the handle 38 can be adjusted by sliding the handle freely to-and-fro within the aperture 67 formed in the clamp bolt 68. At the same time, the angular position of the handle with respect to the bracket 65 can be selected by simply rotating the handle about the axis of the aperture 69. When the desired adjustment is achieved, the lock nut 73 is tightened against the lower side of the bracket 65 so as to draw the clamp bolt 68 downwardly. This locks the handle 38 tightly within the notches 71, 72 so as to prevent its axial movement within the aperture 67. Simultaneously, the ring 70 is tightly drawn against the upper surface of the bracket 65 so as to prevent rotational movement of the handle 38 about the axis of the clamp bolt. To facilitate this latter locking action, the upper surface of the bracket 65 about the aperture 69 carries flutes 74 which interlock with correspondingly formed ridges formed on the underside of the ring 70.

By loosening the bolts 66, the angular position of the bracket 65 and thus of the handle 38 can be adjusted about the axis of the main shaft 30.

Preferably, the end of the handle 38 carries a gripping member 75 and mounts an electrical switch 76 which, through conductors 77, can be connected to the control circuit of the camera mounted on the panhead.

In accordance with one aspect of the invention, an adjustable drag is imposed on both tilting and panning movements of the head 10 by interposing a viscous fluid between internal conical surfaces 81 and 81a in the housing 20 and opposed external conical surfaces on axially shiftable brake shoes 82 and 82a secured to the main shaft 30 and the stub shaft 21, respectively. The brake shoe 82 controls tilting movement of the panhead while the brake shoe 82a controls panning movement. Since the construction and mounting of the shoes 82, 82a are identical, corresponding parts have been given the same reference numeral with the distinguishing suffix a added.

The brake shoes 82, 82a are locked to their respective shafts against rotation by bar-like projections 83 and 83a on the shafts (see FIGS. 4 and 5). The bar projections 83, 83a are received in sets of slots 84 and 84a formed in the shoes (see also FIG. 8). The slots 84, 84a are sufficiently deep to permit limited axial movement of the shoes 82, 82a on their respective shafts. Snap rings 85 and 85a are seated in the respective shoes 82, 82a and served to limit the axial movement of the shoes.

To eliminate all looseness between the main shaft 30 and its brake shoe 82, and between the stub shaft 21 and its brake shoe 82a, each of the shoes carries a pair of spring biased snubbers of which only the snubber 86 is shown (see FIG. 5). The snubbers are mounted in apertures 87 and are urged by compressed springs 88 tightly against the bar projections 83. Threaded caps 89 anchor the spring 88 against displacement. It will be understood that similar snubbers are provided in the shoe 82a. Because of these snubbers, absolutely no relative rotation is permitted between the main shaft 30 and the shoe 82, and between the stub shaft 21 and the shoe 82a.

As observed above, the shoes 82, 82a are axially slidable on their respective shafts 30, 21. The shoes are shaped so as to have an outer conical surface which parallels the inner conical surfaces 81, 81a formed in the housing 20. Interposed between these inner and outer conical surfaces is a supply of viscous fluid held in place by seal assemblies 90 and 90a interposed between the skirt of the respective brake shoes 82, 82a and the housing 20. It can thus be seen that rotation of the main shaft 30 in its bearings 31, 32 is resisted by the friction in the fluid between the brake shoe 82 and the conical surface 81. Similarly, any panning movement of the head is resisted by the fluid between the conical surface 81a and the brake shoe 82a.

The frictional resistance created by the brake shoes and respective opposed conical surfaces is directly responsive to the thickness of the intervening film of viscous fluid. The thinner this layer, the more resistance to relative movement between the opposed, parallel conical surfaces results. Thus, the amount of drag resisting panning and tilting movement of the panhead 10 can be controlled by adjusting the spacing between the brake shoes 82a and their respective housing surfaces 81, 81a.

For adjustably positioning the brake shoes, control rods 91 and 91a are slidably mounted in the main shaft 30 and the stub shaft 21, respectively, and are coupled by bars 92 and 92a, respectively, to the shoes 82, 82a. Preferably, the bars 92, 92a pass completely through their respective rods 91, 91a and are received within slots, of which only the slot 93 is shown, formed in the respective shoes. The snap rings 85, 85a lock the bars 92, 92a against axial movement relative to their respective shoes.

The bar 92 passes freely through openings 94 in the main shaft 30, with there being sufficient clearance between the openings 94 and the bar 92 to permit the shoe 82, the bar 92 and the control rod 91 to slide in unison through the full range of adjustment of the shoe. The bar 92a is fitted in similar openings formed in the stub shaft 21 so that the shoe 92a can be shifted upon axial movement of the control rod 91a.

For adjustably positioning the control rods 91, 91a, a differential nut 95 is threadably engaged by both the control rod 91 and the end portion 37 of the main shaft 30, and a differential nut 95a is threadably engaged with both the control rod 91a and the upper end of the stub shaft 21. The differential nuts 95, 95a carry knob portions 96 and 96a, respectively, so that they may be conveniently rotated by the operator of the panhead. As will be familiar to those skilled in the mechanical arts, rotation of the differential nuts 95, 95a produces relative axial movement between the control rods 91, 91a and the main shaft 30 and the stub shaft 21 within which they are slidably mounted. The differential threading provides very fine adjustment of the respective control rods 91, 91a and, hence permits precise positioning of the respective shoes 82, 82a.

Figure 8:
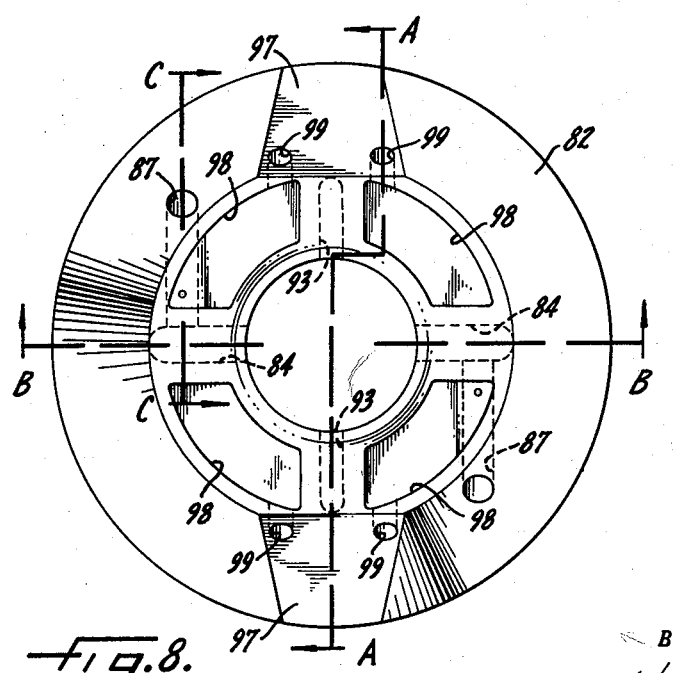
FIG. 8 is an elevation of one of the fluid shoes shown in FIG. 4 and includes lines A—A, B—B and C—C showing the planes in which sections of such shoes are taken at the upper right of FIG. 4, at the center of FIG. 4, and in FIG. 5, respectively.

To insure proper operation of the brake shoes 82, 82a, with respect to their opposed internal conical surfaces 81, 81a and to also control the supply of fluid between these opposed conical surfaces, the brake shoes are formed with flatted portions of which the portions 97 formed on the brake shoe 82 are representative (see FIG. 8). The shoe 82 is also formed with reservoir portions 98 which connect with the flatted portions 97 through apertures 99. It will be understood that the brake shoe 82a is similarly constructed.

The effect of the flatted portions 97 is to constitute a plurality of scraping edges tending to distribute the viscous fluid about the inner conical surfaces 91 upon relative rotation of the shoe 82. In addition, when the shoe 82 is shifted to the right in FIG. 4 so as to separate the opposed conical surfaces, additional fluid is fed from the reservoir portions 98 through the apertures 99 to the flatted portions 97 where the additional fluid is spread directly between the opposed conical surfaces so as to maintain an adequate supply of fluid between the surfaces. The similarly formed shoe 82a, of course, performs in a corresponding manner. Uniform resistance is thus maintained through all adjusted positions of the shoes 82, 82a.

As a further feature of the invention, tilting and panning brakes are provided for solidly locking the panhead housing 20 without disturbing the position of the platforms 12, 13. To provide a panning brake, a pair of brake rings 101 and 102 are fixed relative to the stub shaft 21 by being secured to the base plate 15. The rings 101, 102 form opposed flange portions which define an arcuate slot 103 that is transverse to the stub shaft 21 and which has an axis which coincides with the axis of the stub shaft. To enable the panhead to be rotated through a complete circle or 360°, the slot 103 extends entirely around the periphery of the base plate 15.

Figure 7:
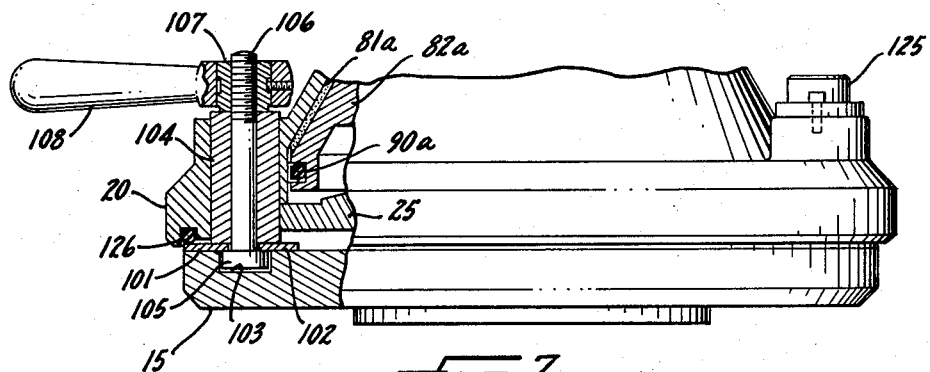
FIG. 7 is still another fragmentary section showing an additional detail of the panhead appearing in FIG. 2.

A brake reaction member 104 is rigidly mounted in the housing 20 so as to closely overlie the rings 101, 102 (see FIG. 7). The reaction member 104 mounts a brake shoe 105 having shoulders which underlie the flange portions of the rings 102, 101, so as to sandwich these flange portions between the shoulders of the brake shoe 105 and the brake reaction member 104. In the illustrated embodiment, brake shoe 105 is secured to a threaded rod portion 106 which carries a nut 107 having a rigidly secured handle 108. By giving a slight turn to the handle 108, the nut 107 draws the rod 104 upwardly so as to clamp the rings 101, 102 between the brake shoe 105 and the brake reaction member 104. This securely locks the panhead housing 20 with respect to the base plate 15 and the stub shaft 21 about which the housing rotates.

Since this locking force is applied in a direction parallel to the axis of rotation of the housing 20, it has been found that locking and unlocking the panning brake does not disturb the positioning of the camera platforms 12, 13 by as much as 1/1000 of an inch.

Figure 6:
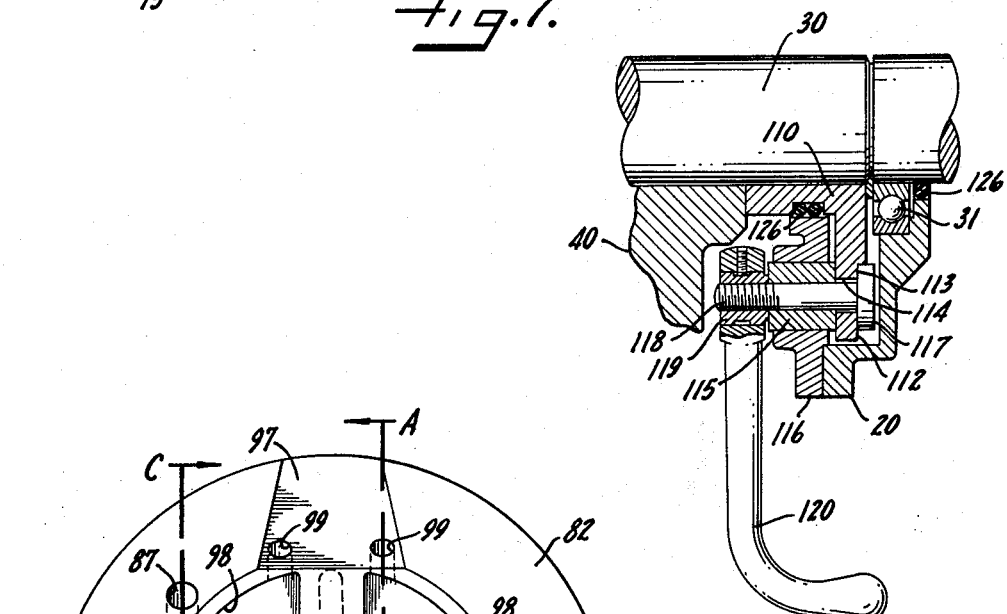
FIG. 6 is a fragmentary section showing another detail of construction of the panhead illustrated in FIG. 2.

To provide a tilting brake, a plate 110 is keyed at 111 to the main shaft 30 and is formed with opposed flange portions 112 and 113 which define an arcuate slot 114 (see FIGS. 4 and 6). The slot 114 is transverse to the axis of the main shaft 30 and has an axis which coincides with the axis of rotation of the shaft 30. Preferably, the slot 114 extends through an arc of approximately 185° in the plate 110 so as to permit the camera platforms 12, 13 to be tilted through a range from −90° through +95°. A brake reaction member 115 is mounted in an end plate 116, forming a part of the housing 20, and the member 115 supports a brake shoe having shoulders which sandwich the flange portions 112, 113 between the brake shoe and the brake reaction member 115. The shoe 117 carries a threaded rod 118 having a nut 119 and a handle 120 mounted thereon so that by slightly swinging the handle 120, the flange portions 112, 113 can be tightly gripped between the brake shoe 117 and the brake reaction member 115. Again, it will be noted that this brake-applying force is exerted in a direction parallel to the axis of rotation of the main shaft 30 and, hence, the brake can be engaged and disengaged without disturbing, in the slightest, the positions of the platforms 12, 13.

To facilitate the setting up of the panhead, a bull's-eye type of bubble level 125 is mounted on the housing 20.

For making the housing completely weathertight, O-ring seals 126 are interposed between the main shaft 30 and the housing, and between the housing 20 and the base plate 15.

It can be seen that the panhead 10 provides an exceptionally efficient and precisely adjustable drag mechanism. Since the friction producing surfaces are conical, their relative spacing can be easily adjusted by simple axial movement of the brake shoes 82, 82a. Yet the opposed conical surfaces which act against the viscous fluid present substantial areas to the fluid which are well spaced from the axis of rotation of the respective parts so that the drag forces have a suitable lever arm through which to work.

Furthermore, the conical configuration of the opposed drag surfaces insures that the viscous fluid is "stored" above the conical surfaces; the seals 90, 90a preventing surplus fluid from being forced below the surfaces. Thus, the stored fluid is instantly available to fill the space between the conical surfaces as the shoes 82, 82a are adjusted.

It will be apparent from the discussion above that the panhead 10 is completely adjustable to meet virtually any desired operating situation. Because of the described construction, critical looseness and play between the various parts is eliminated and complete adjustment has been achieved.

I claim as my invention:

1. In a panhead, the combination comprising a base plate, a generally vertically extending stub shaft secured to said base plate, a housing mounted on said stub shaft, bearings interposed between said housing and said stub shaft so as to prevent axial movement and permit rotational movement of the housing on the stub shaft, a main shaft journalled in said housing on a generally horizontal axis, said main shaft having opposite end portions extending from said housing, a bracket secured to one of said extending portions of the main shaft, said bracket and said main shaft having portions with opposed grooves, a roll pin fitted in said grooves, and means for drawing said bracket and shaft portions firmly together to slightly compress said roll pin and thus lock said bracket for rotation with said main shaft without looseness or play, and means for securing a camera on said bracket so that a horizontal line through the center of gravity in the camera substantially coincides with the axis of said main shaft.

2. In a panhead, the combination comprising a base plate, a generally vertically extending stub shaft secured to said base plate, a housing mounted on said stub shaft, bearings interposed between said housing and said stub shaft so as to prevent axial movement and permit rotational movement of the housing on the stub shaft, said housing having an internal conical surface concentric with said stub shaft, a fluid shoe slidably mounted on said stub shaft and having an external conical surface closely spaced from the internal conical surface, means locking said shoe against rotation around said stub shaft, a main shaft journalled in said housing on a generally horizontal axis, said housing having an internal conical surface concentric with said main shaft, a fluid shoe slidably mounted on said main shaft and having an external conical surface closely spaced from the internal conical surface concentric with said main shaft, means locking said shoe against rotation on said main shaft, a viscous fluid interposed between said sets of conical surfaces, means for varying the spacing of said sets of conical surfaces, and a platform secured to said main shaft for supporting an instrument.

3. In a panhead, the combination comprising a base plate, a generally vertically extending stub shaft secured to said base plate, a housing mounted on said stub shaft, bearings interposed between said housing and said stub shaft so as to prevent axial movement and permit rotational movement of the housing on the stub shaft, said housing having an internal conical surface concentric with said stub shaft, a fluid shoe slidably mounted on said stub shaft and having an external conical surface closely spaced from said internal conical surface, means locking said shoe against rotation about said stub shaft, a main shaft journalled in said housing on a generally horizontal axis, said housing having an internal conical surface concentric with said main shaft, a fluid shoe slidably mounted on said main shaft and having an external conical surface closely spaced from the internal conical surface concentric with said main shaft, means locking said shoe against rotation on said main shaft, a viscous fluid interposed between said sets of conical surfaces, said main shaft having opposite end portions extending from said housing, a handle adjustably secured to one of said extending portions of the main shaft, a bracket secured to the other one of said extending portion of the main shaft, and means for securing a camera on said bracket so that a horizontal line through the center of gravity in the camera substantially coincides with the axis of said main shaft.

4. A drag mechanism for a panhead comprising in combination, a housing having an internal conical surface, a shaft journalled in said housing for relative rotation between the housing and the shaft about an axis coinciding with the axis of said conical surface, a fluid shoe slidably mounted on said shaft within said housing, a bar coupling said shaft and shoe against relative rotation, a spring loaded device bearing against said bar to take all looseness out of said coupling, said shoe having an external substantially conical surface opposing and paralleling said internal conical surface, a viscous fluid interposed between said surfaces, and means for sliding said shoe on said shaft so as to vary the spacing between said conical surfaces.

5. A drag mechanism for a panhead comprising, in combination, a housing having an internal conical surface, a shaft journalled in said housing for relative rotation between the housing and the shaft about an axis coinciding with the axis of said conical surface, a fluid shoe slidably mounted on said shaft within said housing, means locking said shaft and shoe against relative rotation, said shoe having an external substantially conical surface opposing and paralleling said internal conical surface, a viscous fluid interposed between said surfaces, a rod slidably mounted in said shaft for axial shifting movement, means coupling said rod and said shoe so that said shifting movement of the rod varies the spacing between said conical surfaces, a differential nut threadably engaged with both said shaft and said rod so that rotation of said nut shifts said rod in said shaft, and an adjustment knob carried with said nut.

6. A drag mechanism for a panhead comprising, in combination, a housing having an internal conical surface, a shaft journalled in said housing for relative rotation between the housing and the shaft about an axis coinciding with the axis of said conical surface, a fluid shoe slidably mounted on said shaft within said housing, means locking said shaft and shoe against relative rotation, said shoe having an external substantially conical surface opposing and paralleling said internal conical surface, a viscous fluid interposed between said surfaces, said exterior conical surface having a flatted portion for sweeping fluid over said internal surface upon relative rotation of said shaft and housing, means for sliding said shoe on said shaft so as to vary the spacing between said conical surfaces, and said shoe having a reservoir and passages from said reservoir to said flatted portion for controlling the supply of said fluid between the conical surfaces as their spacing is varied.

7. A drag mechanism for a panhead comprising, in combination, a housing having an internal conical surface, a shaft journalled in said housing for relative rotation between the housing and the shaft about an axis coinciding with the axis of said conical surface, a fluid shoe slidably mounted on said shaft within said housing, means locking said shaft and shoe against relative rotation, said shoe having an external substantially conical surface opposing and paralleling said internal conical surface, a viscous fluid interposed between said surfaces, said exterior conical surface having a flatted portion for sweeping fluid over said internal surface upon relative rotation of said shaft and housing, a rod slidably mounted in said shaft for axial shifting movement, means coupling said rod and said shoe so that said shifting movement of the rod varies the spacing between said conical surfaces, a differential nut threadably engaged with both said shaft and said rod so that rotation of said nut shifts said rod in said shaft, an adjustment knob carried with said nut, and means defining a reservoir and passages from said reservoir to said conical surfaces for controlling the supply of said fluid between the conical surfaces as their spacing is varied by adjustment of said knob.

8. In a panhead, the combination comprising a base plate, a generally vertically extending stub shaft secured to said base plate, a housing rotatably mounted on said stub shaft, means defining an arcuate slot fixed relative to said stub shaft lying in a plane transverse to said stub shaft and having an axis coinciding with the axis of said stub shaft, a main shaft journalled in said housing on a generally horizontal axis, an instrument platform secured to said main shaft, means defining an arcuate slot fixed relative to said main shaft lying in a plane transverse to said main shaft and having an axis coinciding with the axis of said main shaft, a pair of brake shoes movably mounted on said housing with each brake shoe rotating within a respective one of said slots, and means for selectively locking said brake shoes relative to said slots.

9. In a panhead, the combination comprising a base plate, a generally vertically extending stub shaft secured to said base plate, a housing rotatably mounted on said stub shaft, a pair of concentric rings fixed relative to said stub shaft defining an arcuate slot lying in a plane transverse to said stub shaft and having an axis coinciding with the axis of said stub shaft, a main shaft journalled in said housing on a generally horizontal axis, an instrument platform secured to said main shaft, a plate secured to said main shaft defining an arcuate slot lying in a plane transverse to said main shaft and having an axis coinciding with the axis of said main shaft, a pair of brake shoes movably mounted on said housing with each brake shoe rotating within a respective one of said slots, a pair of brake reaction members mounted on said housing with each member being associated with the respective one of said brake shoes, and means for selectively moving said shoes so as to clamp either or both of said plate or said concentric rings between said shoes and the associated reaction members.

10. In a panhead, the combination comprising a base plate, a generally vertically extending stub shaft secured to said base plate, a housing rotatably mounted on said stub shaft, a pair of concentric rings fixed relative to said stub shaft defining an arcuate slot lying in a plane transverse to said stub shaft and having an axis coinciding with the axis of said stub shaft, means interposed between said housing and said stub shaft for frictionally resisting rotation of said housing on said stub shaft, a main shaft journalled in said housing on a generally horizontal axis, an instrument platform secured to said main shaft, a plate secured to said main shaft defining an arcuate slot lying in a plane transverse to said main shaft and having an axis coinciding with the axis of said main shaft, means interposed between said housing and said main shaft for frictionally resisting rotation of said main shaft in said housing, a pair of brake shoes movably mounted on said housing with each brake shoe rotating within a respective one of said slots, a pair of brake reaction members mounted on said housing with each member being associated with the respective one of said brake shoes, and means for selectively moving said shoes so as to clamp either or both of said plate or said concentric rings between said shoes and the associated reaction members.

11. A locking mechanism for a panhead comprising, in combination, a housing, a shaft journalled in said housing for relative rotation between the housing and the shaft, means fixed relative to said shaft including opposed flange portions defining an arcuate slot lying in a plane transverse to said shaft and having an axis coinciding with the axis of said shaft, a brake shoe movably mounted on said housing for rotation in said slot, a brake reaction member mounted on said housing so that said shoe and said member sandwich said flange portions, and means for selectively moving said shoe so as to clamp said flange portions between the shoe and said reaction member.

12. A locking mechanism for a panhead comprising, in combination, a housing, a shaft journalled in said housing for relative rotation between the housing and the shaft, means fixed relative to said shaft including opposed flange portions defining an arcuate slot lying in a plane transverse to said shaft and having an axis coinciding with the axis of said shaft, a bushing mounted on said housing so as to rotate adjacent said flange portions, a brake shoe threaded in said bushing and extended through said slot, said shoe having shoulders disposed to sandwich said flange portions between the shoulders and said bushing, and a brake handle on said brake shoe for turning said shoe so as to clamp said flange portions between said shoulders and said bushing.

References Cited by the Examiner
UNITED STATES PATENTS

| | | | |
|---|---|---|---|
| 2,514,313 | 7/50 | Davidson | 248—183 |
| 2,516,472 | 7/50 | MacKeage | 287—52.05 |
| 2,666,610 | 1/54 | Nerman | 248—183 |
| 2,719,690 | 10/55 | Zucker | 248—183 |
| 2,905,421 | 9/59 | O'Connor | 248—183 |

CLAUDE A. LE ROY, *Primary Examiner.*